(12) United States Patent
Kuehr-McLaren et al.

(10) Patent No.: US 7,992,200 B2
(45) Date of Patent: Aug. 2, 2011

(54) SECURE SHARING OF TRANSPORT LAYER SECURITY SESSION KEYS WITH TRUSTED ENFORCEMENT POINTS

(75) Inventors: David G. Kuehr-McLaren, Apex, NC (US); Linwood H. Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1050 days.

(21) Appl. No.: 11/778,396

(22) Filed: Jul. 16, 2007

(65) Prior Publication Data

US 2009/0025078 A1    Jan. 22, 2009

(51) Int. Cl.
*G06F 9/00* (2006.01)
*G06F 15/16* (2006.01)

(52) U.S. Cl. .......................................... 726/12; 380/259
(58) Field of Classification Search .................. 380/259; 726/12

See application file for complete search history.

(56) References Cited

U.S. PATENT DOCUMENTS

2007/0192587 A1* 8/2007 Yato et al. ..................... 713/155
2008/0126794 A1* 5/2008 Wang et al. ................... 713/151
* cited by examiner

*Primary Examiner* — Christopher J Brown
(74) *Attorney, Agent, or Firm* — Steven M. Greenberg, Esq.; Carey, Rodriguez, Greenberg & Paul

(57) ABSTRACT

Embodiments of the present invention address deficiencies of the art in respect to security enforcement point operability in a TLS secured communications path and provide a novel and non-obvious method, system and computer program product for the secure sharing of TLS session keys with trusted enforcement points. In one embodiment of the invention, a method for securely sharing TLS session keys with trusted enforcement points can be provided. The method can include conducting a TLS handshake with a TLS client to extract and decrypt a session key for a TLS session with the TLS client traversing at least one security enforcement point. The method further can include providing the session key to a communicatively coupled key server for distribution to the at least one security enforcement point. Finally, the method can include engaging in secure communications with the TLS client over the TLS session.

13 Claims, 2 Drawing Sheets

SECURE SHARING OF TRANSPORT LAYER SECURITY SESSION KEYS WITH TRUSTED ENFORCEMENT POINTS

BACKGROUND OF THE INVENTION

1. Field of the Invention

The present invention relates to the field of network security and more particularly to security enforcement point processing of encrypted data in a communications path.

2. Description of the Related Art

Internet security has increasingly become the focus of information technologists who participate in globally accessible computer networks. In particular, with the availability and affordability of broadband Internet access, even within the small enterprise, many computers and small computer networks enjoy continuous access to the Internet. Notwithstanding, continuous, high-speed access is not without its price. Specifically, those computers and computer networks which heretofore had remained disconnected from the security risks of the Internet now have become the primary target of malicious Internet malfeasors.

To address the vulnerability of computing devices exposed to the global Internet, information technologists intend to provide true, end-to-end security for data in the Internet through secure communications. Transport Layer Security (TLS) and its predecessor, Secure Sockets Layer (SSL), are cryptographic protocols which provide secure communications on the Internet for such things as web browsing, e-mail, Internet faxing, instant messaging and other data transfers. There are slight differences between SSL 3.0 and TLS 1.0, but the protocol remains substantially the same. In operation, TLS involves two processing phases. First, there is a key exchange or "handshake" phase, in which the server and client attempt to agree upon an encryption suite to be used for data transmission. Subsequently, a bulk encryption or data transmission phase is carried out in which the desired content is transmitted using the agreed-upon encryption suite.

The secured communications path defined between two TLS endpoints often incorporate one or more security enforcement points such as a virtual private network (VPN)/firewall. Security enforcement points generally are no different than any other computing device excepting that the computing device supporting a security enforcement point hosts logic including program code enabled to support security services such as IP packet filtering, intrusion detection, load balancing and quality of service (QoS) setting management. Yet, where a security enforcement point has been positioned in the midst of a TLS secure communications path, the enforcement point will have no access to cleartext data in traversing data. Consequently, the security function of a security enforcement point in a secure TLS communications path will have become inoperable as most security functions require access to unencrypted, cleartext data.

In response, customers often choose between not running encryption (or at least not for the entire communications path), or running encryption on a hop-by-hop basis so that cleartext is available at the enforcement points. In the latter circumstance, even if the entire communications path has been protected end-to-end in a hop-by-hop configuration, the authentication as a whole is not end-to-end. Rather, a given node authenticates only to the next hop node. Additionally, in the hop-by-hop configuration, the TLS server key and certificate along with the private key and certificate must be stored at each enforcement point—an undesirable outcome.

Other TLS proxy methods have been proposed to provide security gateways and SSL aware enforcement points. These proposals usually involve sharing the private key and certificate of the TLS server endpoint, where the private key is used to monitor the session, or terminating the client to server session in the enforcement point (hop-by-hop encryption). Additionally, yet other key recovery schemes have been proposed to save the keys from TLS session in central key recovery server so that the clear text of the recorded TLS session could be recovered at a later time.

BRIEF SUMMARY OF THE INVENTION

Embodiments of the present invention address deficiencies of the art in respect to security enforcement point operability in a TLS secured communications path and provide a novel and non-obvious method, system and computer program product for the secure sharing of TLS session keys with trusted enforcement points. In one embodiment of the invention, a method for securely sharing TLS session keys with trusted enforcement points can be provided. The method can include conducting a TLS handshake with a TLS client to extract and decrypt a session key for a TLS session with the TLS client traversing at least one security enforcement point. The method further can include providing the TLS session information including the session encryption key to a communicatively coupled key server for distribution to the at least one security enforcement point. Finally, the method can include engaging in secure communications with the TLS client over the TLS session.

In one aspect of the embodiment, the method can include withholding completion of the TLS handshake with the TLS client until receiving confirmation from the coupled key server that the at least one security enforcement point has installed the TLS session information including session key for use in decrypting enciphered data for TLS secured payloads traversing the security enforcement point from the TLS client. Thereafter, the TLS handshake can be completed only once having received the confirmation. In another aspect of the embodiment, providing the TLS session information including session key to a communicatively coupled key server for distribution to the at least one security enforcement point, can include providing the TLS session information including session key to a communicatively coupled key server for distribution to subscribing ones of the at least one security enforcement point, or to requesting ones of the at least one security enforcement point.

In another embodiment of the invention, a secure communications data processing system for securely sharing TLS session keys with trusted enforcement points can be provided. The system can include a TLS endpoint configured for coupling to TLS clients, a key server communicatively coupled to the TLS endpoint, and at least one security enforcement point disposed between the TLS clients and the TLS endpoint. The security enforcement point can include a secure and trusted communicative link with the key server over which TLS session information including session keys for corresponding secure communications paths between the TLS clients and the TLS endpoint are installed in the security enforcement point.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for secure sharing of TLS session information including session keys with trusted enforcement points. In accordance with an embodiment of the present invention, a security enforcement point disposed within a secure communications path such as that defined between TLS endpoints, can establish a secure encrypted session with a key server. Once the secure encrypted session has been established, a TLS session can be established that provides for a secure communications path traversing the security enforcement point. The TLS endpoint for the TLS session can provide its TLS session information with session keys to the key server. Thereafter, the key server can provide on demand to the security enforcement point the TLS session information for the TLS session in order to allow the security enforcement point to decrypt traversing data in the secure communications path.

In this way, unlike the hop-by-hop configuration where the enforcement point maintains a copy of the TLS endpoint session information with session keys, in the instant configuration, neither the private key nor the certificate are stored at the security enforcement point. Rather, the security enforcement points cannot satisfy a request for a TLS session from TLS client, but the security enforcement point only enjoys access to specific TLS sessions as controlled by the central server. In addition, when client certificate authentication is required by the server, the identity of the client can be preserved and protected by the TLS session from the client to the intended TLS server endpoint. Finally, unlike the key recovery method of centrally storing keys and session data, in the instant configuration security enforcement points can enjoy real time access to the cleartext of a TLS session.

Figure 1:
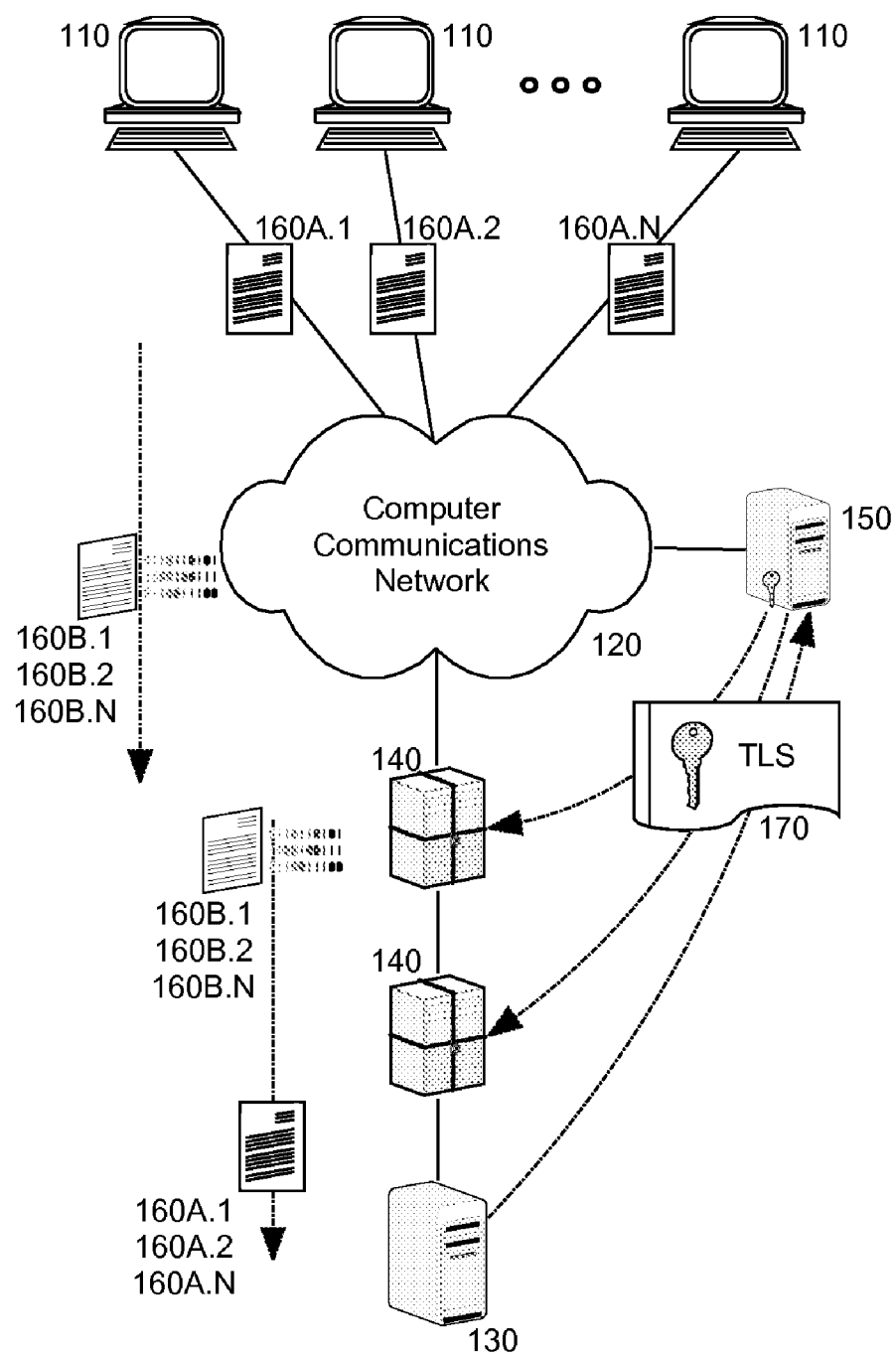
FIG. 1 is a schematic illustration of a network data processing system configured for secure sharing of TLS session information including session keys with trusted enforcement points; and, FIG. 2 is an event diagram illustrating a process for secure sharing of TLS session information including session keys with trusted enforcement points.

In illustration, FIG. 1 depicts a network data processing system configured for security enforcement point inspection of encrypted data in a secure, end-to-end communications path. The system can include one or more client computing devices 110 communicatively coupled to a server computing device 130 over a computer communications network 120. Each of the client computing devices 110 can include a content browser such as a Web browser and can be configured to establish a TLS session for end-to-end secure communications with the server computing device 130, for example a Web server.

One or more security enforcement points 140 can be positioned intermediately between the client computing devices 110 and the server computing device 130 in the midst of the secure communications path. The security enforcement points 140 can be configured to perform any of several security functions, ranging from packet filtering, content inspection and intrusion detection to load balancing and QoS management. Notably, as shown in FIG. 1, each of the security enforcement points 140 can be coupled to a key server 150 in secure, trusted relationship in which each of the security enforcement points 140 authenticates with the key server 150 and enjoys a secured communications path with the key server 150 over which encrypted data can be securely passed between the security enforcement points 140 and the key server 150.

The key server 150 in turn can be coupled to the server computing device 130 and, in consequence, can maintain an awareness of the TLS session information 170 for the TLS secure communications path established between an individual one of the client computing devices 110 and the server computing device 130. In operation, different end-to-end secure communications paths can be established between individual ones of the client computing devices 110 and the server computing device 130. In the course of establishing each of the end-to-end secure communications paths, individual TLS session keys 170 can be established and provided separately to the key server 150. The key server 150, in turn, can provide the TLS session information including session keys 170 to all or selected ones of the security enforcement points 140. In this regard, the security enforcement points 140 either selectively can subscribe to different ones of the TLS sessions including session keys 170, or the security enforcement points 140 can dynamically request the TLS session information including session keys 170 of the key server 150, or the security enforcement points 140 can receive all of the TLS session information including session keys 170.

Thereafter, one or more cleartext payloads 160A.1, 160A.2, 160A.N for respective TLS secured communications paths can be transformed into corresponding encrypted payloads 160B.1, 160B.2, 160B.N and transmitted over the respective TLS secured communications paths to the server computing device 130 where the encrypted payloads 160B.1, 160B.2, 160B.N can be decrypted into cleartext payloads 160A.1, 160A.2, 160A.N. At each of the security enforcement points 140 there between, however, the encrypted payloads 160B.1, 160B.2, 160B.N can be decrypted for use in performing associated security functions through the TLS session information including session keys 170 for each of the TLS secured communications paths. As a result, the intermediately disposed security enforcement points 140 can perform security functions on decrypted cleartext without requiring knowledge of the client computing devices 110 and without requiring the client computing devices 110 to have knowledge of the security enforcement points 140.

Figure 2:
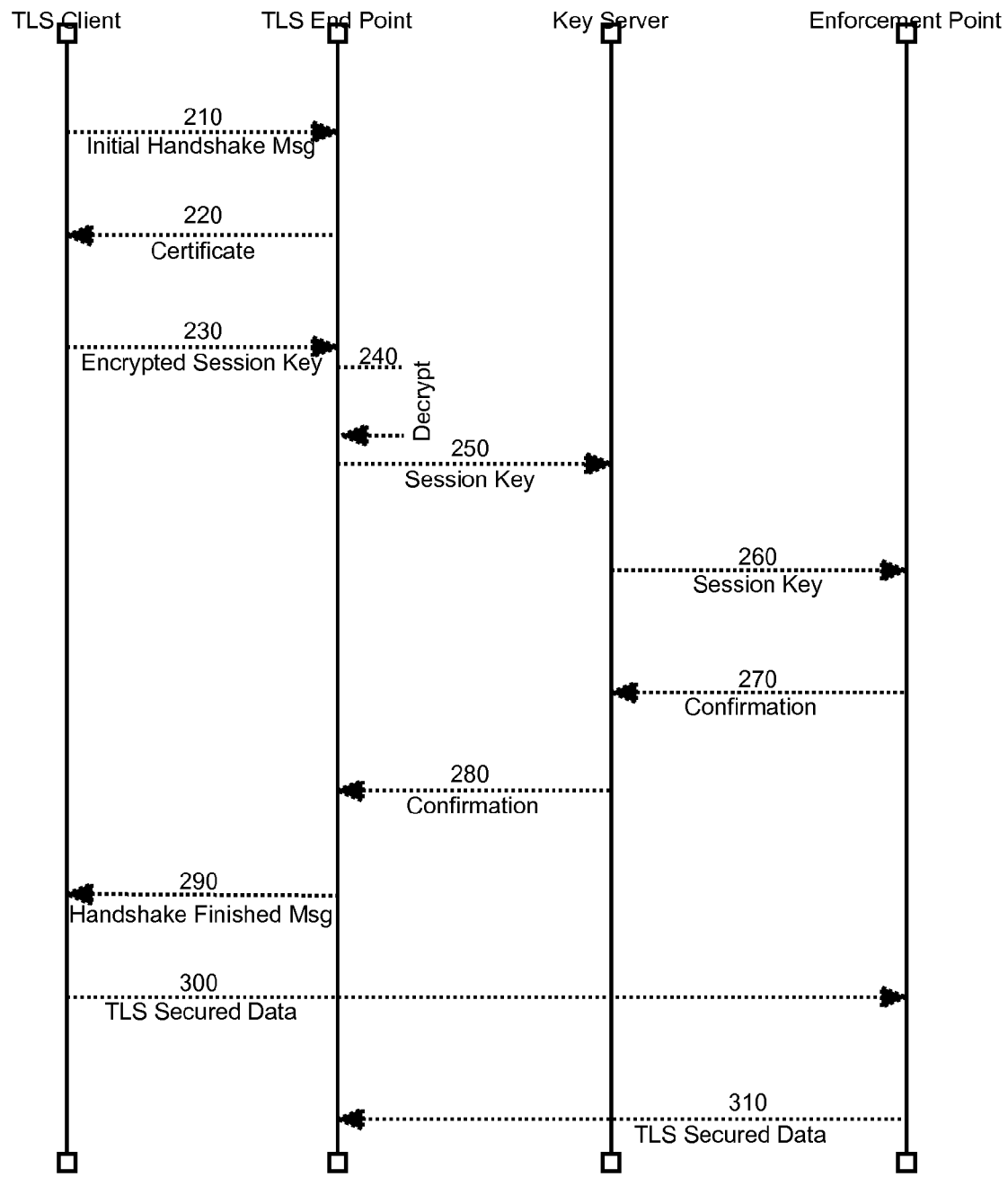

FIG. 2 is an event diagram illustrating a process for secure sharing of TLS session keys with trusted enforcement points. Beginning in path 210, an initial handshake message can be transmitted from a TLS client to a TLS endpoint. In path 220, the TLS endpoint can return a certificate which provides the public key for the TLS endpoint. Subsequently, in path 230 the TLS client can use the public key for the TLS endpoint to encrypt a pre-master secret for a proposed TLS secured communication path between the TLS client and the TLS endpoint. Finally, the TLS endpoint in path 240 can decrypt the pre-master secret using the private key for the TLS endpoint. Both the TLS client and TLS endpoint can independently create the same symmetric session keys based on the premaster secret that is now known to both the TLS client and TLS endpoint.

In order to delay the transmission of encrypted data across the newly established TLS secured communications path before the enforcement point possesses knowledge of the session, the handshake finished message can be withheld. In particular, either the TLS endpoint can withhold the handshake finished message, or the security enforcement point can withhold the handshake finished message. In either case, in path 250, the session key can be provided to the key server along with other session attributes such as the starting initialization vector, one or more selected cipher algorithms, and a session identifier. The key server, in turn, in path 260 can provide a copy of the session information including session key to each subscribing enforcement point coupled to the key server. In this regard, individual enforcement points can subscribe to receive TLS session information including session keys for one or more corresponding TLS clients. Alternatively, the TLS session information including session keys can be provided to all coupled enforcement points, or the TLS session information including session keys can be provided on demand to requesting enforcement points.

In any event, in path 270, a confirmation can be returned to the key server confirming the installation of the TLS session information including session key in a corresponding enforcement point. Likewise, in path 280 the key server can provide to the TLS endpoint a confirmation of installation of the TLS session information including session key in one or more enforcement points. Once the TLS endpoint receives confirmation from the key server, in path 290 a handshake finished message can be returned to the TLS client. Finally, in block 300 TLS secured data can flow through the enforcement point en route to the TLS endpoint and the enforcement point can decrypt all or only a portion of a traversing data in order to perform one or more functions for the enforcement point before forwarding the TLS secured data flow to the TLS endpoint in path 310.

Embodiments of the invention can take the form of an entirely hardware embodiment, an entirely software embodiment or an embodiment containing both hardware and software elements. In a preferred embodiment, the invention is implemented in software, which includes but is not limited to firmware, resident bv software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for securely sharing transport layer security (TLS) session keys with trusted enforcement points, the method comprising:
conducting a TLS handshake with a TLS client to create a session key for a TLS session with the TLS client traversing at least one security enforcement point;
providing the session key to a communicatively coupled key server for distribution to the at least one security enforcement point;
engaging in secure communications with the TLS client over the TLS session;
withholding completion of the TLS handshake with the TLS client until receiving confirmation from the coupled key server that the at least one security enforcement point has installed the session key for use in decrypting enciphered data for TLS secured payloads traversing the security enforcement point from the TLS client; and
completing the TLS handshake once receiving the confirmation.

2. The method of claim 1, further comprising
providing not only the session key to the communicatively coupled key server, but also an initialization vector for the TLS session.

3. The method of claim 1, further comprising
providing not only the session key to the communicatively coupled key server, but also a cipher algorithm for the TLS session.

4. The method of claim 1, further comprising
providing not only the session key to the communicatively coupled key server, but also a session identifier for the TLS session.

5. The method of claim 1, wherein
the session key is provided to the communicatively coupled key server for distribution to subscribing ones of the at least one security enforcement point.

6. The method of claim 1, wherein
the session key is provided to the communicatively coupled key server for distribution to requesting ones of the at least one security enforcement point.

7. A secure communications data processing system for securely sharing transport layer security (TLS) session keys with trusted enforcement points, the system comprising:
a TLS endpoint configured for coupling to a plurality of TLS clients;
a key server communicatively coupled to the TLS endpoint; and
at least one security enforcement point disposed between the TLS clients and the TLS endpoint, the security enforcement point comprising a secure and trusted communicative link with the key server over which TLS session keys for corresponding secure communications paths between the TLS clients and the TLS endpoint are installed in the security enforcement point, wherein the key server has a hardware processor configured to provide a confirmation to the TLS endpoint that the at least one security enforcement point has installed a session key for use in decrypting enciphered data for TLS secured payloads traversing the at least one security enforcement point from one of the TLS clients, and the TLS endpoint configured to withhold completion of a TLS handshake with the one of the TLS clients until receiving the confirmation from the key server, and complete the TLS handshake upon receiving the confirmation.

8. A computer program product comprising a computer usable storage device having stored therein computer usable program code for securely sharing transport layer security (TLS) session keys with trusted enforcement points, the computer usable program code, which when executed by a computer hardware system, causes the computer hardware system to perform conducting a TLS handshake with a TLS client to create a session key for a TLS session with the TLS client traversing at least one security enforcement point;

providing the session key to a communicatively coupled key server for distribution to the at least one security enforcement point;

engaging in secure communications with the TLS client over the TLS session;

withholding completion of the TLS handshake with the TLS client until receiving confirmation from the coupled key server that the at least one security enforcement point has installed the session key for use in decrypting enciphered data for TLS secured payloads traversing the security enforcement point from the TLS client; and completing the TLS handshake once receiving the confirmation.

9. The computer program product of claim 8, wherein the computer usable program code further causes the computer hardware system to perform providing not only the session key to the communicatively coupled key server, but also an initialization vector for the TLS session.

10. The computer program product of claim 8, wherein the computer usable program code further causes the computer hardware system to perform providing not only the session key to the communicatively coupled key server, but also a cipher algorithm for the TLS session.

11. The computer program product of claim 8, wherein the computer usable program code further causes the computer hardware system to perform providing not only the session key to the communicatively coupled key server, but also a session identifier for the TLS session.

12. The computer program product of claim 8, wherein the session key is provided to the communicatively coupled key server for distribution to subscribing ones of the at least one security enforcement point.

13. The computer program product of claim 8, wherein the session key is provided to the communicatively coupled key server for distribution to requesting ones of the at least one security enforcement point.

* * * * *